Jan. 3, 1928.
E. C. WASHBURN
1,655,078
MOTOR VEHICLE TRANSMISSION MECHANISM
Filed Nov. 24, 1920
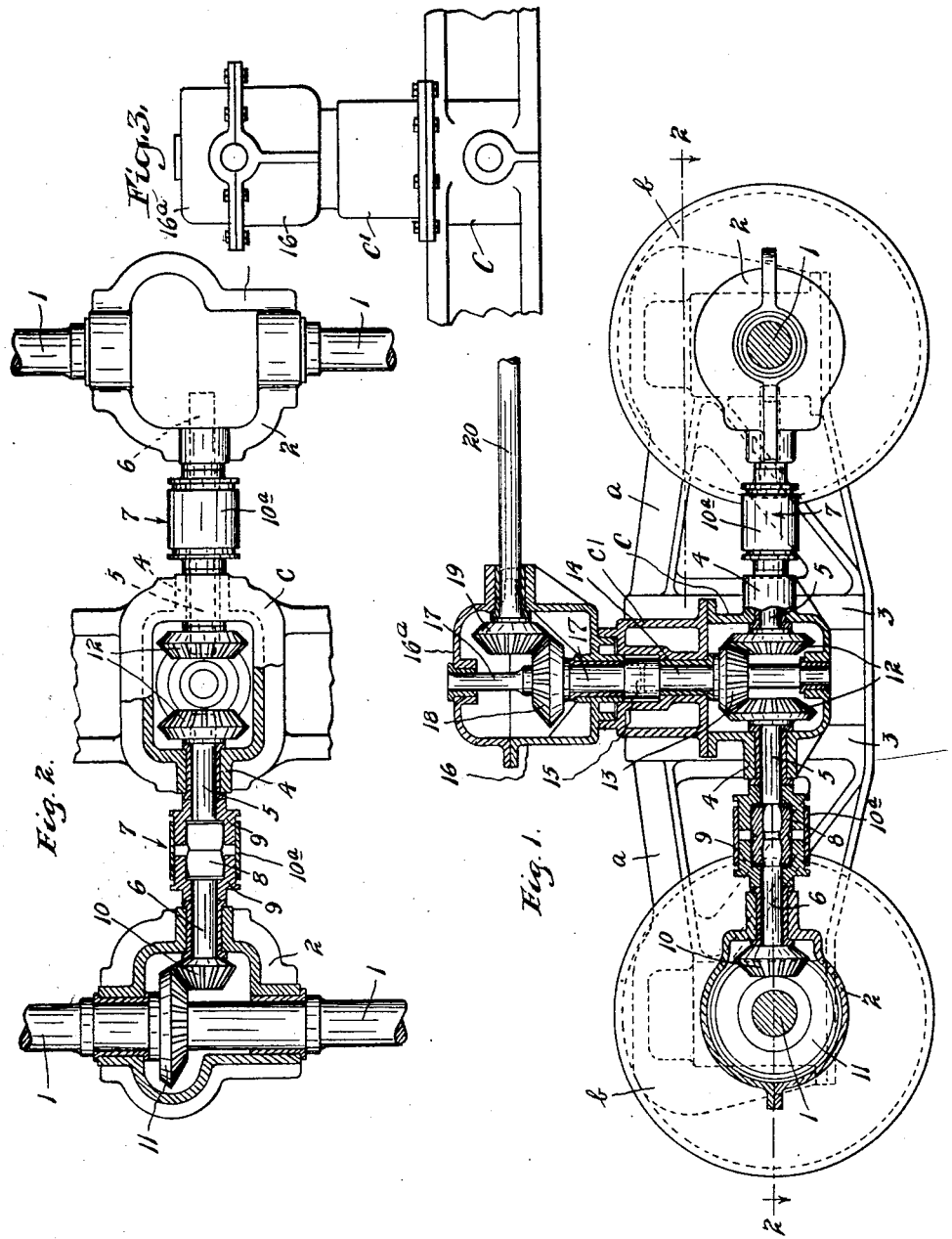
INVENTOR.
EDWIN C. WASHBURN.
BY HIS ATTORNEY.
James F. Williamson Patented Jan. 3, 1928.

1,655,078

UNITED STATES PATENT OFFICE.

EDWIN C. WASHBURN, OF ENGLEWOOD, NEW JERSEY.

MOTOR-VEHICLE TRANSMISSION MECHANISM.

Application filed November 24, 1920. Serial No. 426,291.

This invention relates to a motor vehicle transmission mechanism, and particularly to a transmission mechanism adapted to be applied to such vehicles as street railway, or other railway cars which carry their propelling motors. Owing to the motion of the various parts of such a vehicle, it has heretofore been difficult to provide the same with the direct and positive transmission extending from the motor to the driven wheels.

It is an object of this invention, therefore, to provide a direct drive which is positively driven and connected and which extends from the motor to the driven wheels.

This and other objects and advantages of the invention will become apparent from the following description made in connection with the accompanying drawings, in which Fig. 1 is a view in side elevation, partly in section, of the side frame and wheels of a vehicle having the novel drive mechanism applied thereto;

Fig. 2 is a top sectional plan of Fig. 1 taken approximately on the line 2—2; and Fig. 3 is a partial view in side elevation of the bolster.

Referring to the drawings, the side frame of a vehicle, such as a street railway car, is illustrated at $a$, which receives at its end the bearing boxes of the wheels $b$. The said wheels are adapted to be secured to and driven by the axles 1. These axles are disposed in bushed bearings 2 which bearings will be either entirely supported by the axles and shafts connected therewith, or may be also suitably supported by attachment to some convenient part of the car. The side frames $a$ are provided with the usual bolster columns and guides 3 and a bolster $c$ is illustrated, the central part of which, as shown, is constructed as a gear or transmission housing. The lower part of this bolster is formed as an openended substantially rectangular box member which has formed at opposite sides thereof aligned bearings 4 suitably bushed to receive oppositely extending shaft 5. These bearings are aligned with bearings formed in the adjacent sides of the members 2 which are also suitably bushed to receive a pair of shafts 6. The shafts 5 and 6 are connected between the bolster and the axles by universal joints 7. This joint comprises a member 8 formed with a pair of somewhat elliptical sockets into which extend more or less loosely, formed ends on the shafts 5 and 6. The ends of these shafts will be so formed that they can rock longitudinally in the member 8, and yet will turn the same upon rotation. The member 8 is surrounded by oppositely disposed sleeve members 9 which have open-ended chambers therein extending over the ends of member 8 and from which chambers suitable bores extend to accommodate the shafts 5 and 6. Members 9 are provided with slight flanges or collars between which they carry and are enclosed by a member $10^a$ made of some soft or flexible material. While a particular universal joint has been illustrated and described, it will be understood that any efficient type of universal joint may be used to connect the shafts 5 and 6. The shafts 6 carry beveled pinions 10 at the ends thereof arranged to mesh with gears 11 which are rigidly secured to the axles 1. The shafts 5 carry beveled gears 12 at the ends thereof, which extend into the bolster box, and these gears are arranged to mesh with a pinion 13 which is carried by and rigidly secured to a vertical shaft 14. Shaft 14 is shouldered and suitably supported in a bushed bearing in the bottom of the bolster box and extends upwardly through another bushed bearing into the top section $c'$ of the bolster, which section is provided with flanges adapted to engage with and be secured to corresponding flanges on the bolster box. This upper section of the bolster has a cylindrical chamber immediately above the bushed bearing therein, which chamber is adapted to receive a joining collar 15 into which the shaft 14 projects, and with which the said shaft is splined, or otherwise secured to permit of longitudinal movement therein, but which will be driven by rotation of said shaft. The upper section of the bolster is also provided on its upper side with an upstanding cylindrical flange forming a chamber into which is slidably fitted a cylinder formed by a circular flange depending from a gear housing 16 having a cap portion $16^a$ bolted thereto. This gear housing 16 is generally of the shape of a square box and has disposed centrally in its lower side a bushed bearing through which extends a shaft 17, the lower end of which is also disposed in the joining collar 15 in a manner similar to the shaft 14. The upper end of the shaft 17 is arranged to turn in a bushed bearing in the top of the housing 16. This shaft 17 carries a beveled gear 18 arranged to mesh with another gear 19 carried on a horizontal shaft 20 which extends through a suitable bushed bearing carried by one side of the gear housing 16. The shaft 20 is adapted to be connected to the motor or motor shaft of the vehicle. The motor may be disposed in the vehicle or car or in a sub floor or frame connected therewith.

The above described structure will be seen to be quite flexible. It will be noted that limited vertical motion of the shaft 20 and gear housing 16 is permitted by the mounting of said housing in the top of the bolster and by the arrangement of shaft 17 in the collar 15. The shaft 20 and housing 16 are also capable of common rotation. Owing to the universal joint 7, the bolster may have considerable vertical movement without interfering with the driving of gears 12 and 13. The axles 1 can, likewise, have considerable vertical movement without interfering with the action of the driving gears.

The drive from the motor shaft to the axles will be readily seen. The rotation of the motor shaft 20 is communicated to shaft 17 through the gears 18 and 19. This rotation is communicated to shaft 14 through the collar 15. The shaft 14 drives the gears 12 in opposite directions through the gears 13, which, in turn, drive the shafts 5 which are connected by the universal joints to drive the shafts 6. The shafts 6, in turn, drive the pinions 10 and the axles are thus driven by the gears 11, which are in mesh with said pinions. By the described arrangement, the axles are, of course, both driven in one direction. The described flexibility is of great utility and advantage in the cars with which it is designed to be used. The elevation of the wheels in passing over rail joints and from other causes, is readily taken care of and the various vibratory and swinging motions of the car parts which it is impossible to eliminate, are also taken care of and permitted without seriously affecting the parts of the transmission or interfering with the operation thereof. The different positions assumed by the car parts under various loads, are also permitted and the parts of the transmission mechanism adjust themselves to this position without any disadvantageous results.

It will, of course, be understood that various changes in the details and arrangement of the device may be made without departing from the scope of applicant's invention, which, generally stated, consists in the matter shown and described and set forth in the appended claims.

What is claimed is:

1. The combination with the two wheeled axles of a car truck, a pair of flexible substantially horizontal shafts disposed therebetween and being geared to said axles at one end, a vertical driving shaft, a bevel gear on the lower end of said vertical shaft, bevel gears on the adjacent ends of said horizontal shafts meshing directly with said bevel gear, and a substantially horizontal motor driven shaft geared to the upper end of said vertical shaft.

2. The combination with the two axles of a car truck, of a pair of substantially horizontal flexible shafts being geared at their outer ends to said axles, a substantially vertical shaft to which the inner ends of the horizontal shafts are geared near its lower end, a substantially horizontal motor shaft geared to said vertical shaft near the upper end of the latter, a bearing for supporting said motor shaft and said vertical shaft arranged for vertical movement and said vertical shaft being in sections whereby vertical movement of the said bearing and motor shaft is permitted.

3. A motor vehicle transmission having in combination, spaced car axles, beveled gears thereon, a pair of alined shafts between the axles, beveled gears at the remote ends of said shafts secured thereto and meshing with the gears on said axles, beveled gears secured to the adjacent ends of said shafts, a vertical shaft disposed between said shafts and comprising sections relatively longitudinally movable, a gear on said vertical shaft meshing with said last mentioned gears, and a motor shaft geared to said vertical shaft.

4. A motor vehicle transmission mechanism having in combination a car axle, a beveled gear thereon, a flexible horizontal shaft having a gear at one end meshing with said beveled gear, a rigid bearing enclosing said gears through which the axle and said horizontal shaft extend, a beveled gear at the other end of said flexible shaft, a two part substantially vertical shaft having a beveled gear at its lower portion meshing with said latter gear, a bolster bearing through which the horizontal shaft and the lower end of the vertical shaft extend, said bearing having a cylindrical socket at its upper portion, a substantially horizontal motor shaft, a gear near the upper end of said vertical shaft and a gear on the end of the motor shaft meshing therewith, a rigid bearing through which the upper end of the vertical shaft and the motor shaft extend having a depending cylindrical sleeve disposed in the cylindrical pocket on said bolster bearing, and a shaft coupling connecting the two parts of said vertical shaft whereby vertical movement of the motor shaft in its bearing and driving gears is permitted.

5. The combination with the two axles of a car truck, of gears secured to said axles, two pairs of horizontal shafts between said axles, a gear at the outer shaft of each pair meshing with the gears on said axle, gear boxes surrounding said gears and providing bearings for said axles and shafts, universal couplings connecting the shafts of each pair, gears on the ends of the inner shafts of each pair, a motor driven vertical shaft having a gear at its lower portion meshing with each of said last mentioned gears, and a car housing carried by the truck bolster inclosing said last mentioned gears and providing bearings for the shafts thereof.

6. The combination with the two axles of a car truck, of gears carried thereby, a pair of flexible substantially horizontal shafts extending inwardly from said axles, gears on the outer end of said shafts meshing with the gears on the axles, a gear housing formed in the bolster between said axles and providing bearings for a vertical shaft and the inner ends of said horizontal shafts, gears on the inner end of said horizontal shafts and a gear meshing therewith at the lower portion of said vertical shaft, said gears being enclosed by the said housing, a gear housing above said bolster housing and arranged for vertical sliding movement therein, a substantially horizontal motor shaft, and a second vertical shaft in alignment with said first mentioned vertical shaft having bearings in said gear housing, a gear on the end of said motor driven shaft meshing with the gear at the upper portion of said last mentioned vertical shaft and a shaft coupling carried in said bolster housing for coupling the ends of said vertical shafts to permit longitudinal movement thereof.

7. A motor vehicle transmission mechanism having in combination a substantially horizontal motor shaft, a substantially vertical shaft driven by beveled gears from said motor shaft, a pair of substantially horizontal shafts driven by a beveled gear from said vertical shaft, a pair of car axles driven by beveled gears from said horizontal shafts, and bearings for all of said shafts so constructed and arranged that vertical movement of the axles, vertical shaft and horizontal shaft are permitted without disengagement of said beveled gears.

8. A motor vehicle transmission mechanism having a motor shaft, a driven shaft positively geared thereto, a pair of intermediate driven shafts positively driven by said driven shaft, said intermediate shafts being positively geared to the axles of said vehicle, said parts being constructed and arranged to permit vertical movement of the axles and the motor shaft without disarrangement of said gearing.

9. A motor vehicle transmission having in combination, spaced car axles, beveled gears thereon, a pair of alined substantially horizontal flexible shafts between said axles and geared thereto at their remote ends, a flexible vertical shaft geared to the adjacent ends of said horizontal shafts, and a motor shaft geared to said vertical shaft.

10. The combination with the two axles of a car truck having a rigid frame, of shafts geared to the axles thereof and extending substantially therebetween, a vertical shaft geared to both of said shafts, and a motor shaft geared to said vertical shaft and capable of vertical movement relative to said frame, said motor shaft also being adapted to be swung about said vertical shaft whereby said motor may be located in various positions.

In testimony whereof I affix my signature.

EDWIN C. WASHBURN.